United States Patent [19]
Yeh

[11] Patent Number: 4,509,383
[45] Date of Patent: Apr. 9, 1985

[54] JOYSTICK CONTROLLER

[75] Inventor: Gregory Y. S. Yeh, Kowloon, Hong Kong

[73] Assignee: Championship Electronics (USA) Inc., San Mateo, Calif.

[21] Appl. No.: 446,066

[22] Filed: Dec. 1, 1982

[51] Int. Cl.³ .................. G05G 9/00; H01H 25/04; B65H 75/40; H02G 11/00
[52] U.S. Cl. .................. 74/471 XY; 200/6 A; 273/148 B; 242/96; 191/12.2 R
[58] Field of Search .................. 74/471 XY; 200/6 A; 338/128; 273/148 B; 242/96; 191/12.2 R

[56] References Cited
U.S. PATENT DOCUMENTS

| | | | |
|---|---|---|---|
| 2,348,966 | 5/1944 | Dow et al. | 191/12.2 R X |
| 3,508,721 | 4/1970 | Gaudry | 191/12.2 R |
| 3,588,389 | 6/1971 | Sato | 191/12.2 R |
| 3,813,054 | 5/1974 | Klingspor | 191/12.2 R X |
| 4,124,787 | 11/1978 | Aamoth | 74/471 XY X |
| 4,237,629 | 12/1980 | Schmidt | 200/6 A X |
| 4,349,708 | 9/1982 | Asher | 200/6 A |
| 4,445,011 | 4/1984 | Hansen | 200/6 A X |

OTHER PUBLICATIONS

IBM Technical Disclosure Bulletin, "Cable Storage Reel", vol. 6, No. 7, Dec., 1963.

Primary Examiner—Allan D. Herrmann
Assistant Examiner—Stephen B. Andrews
Attorney, Agent, or Firm—Limbach, Limbach & Sutton

[57] ABSTRACT

An improved joystick controller is disclosed in which the controller has a handle which is pivotally mounted in a base. An electrical cord carries the signal generated by the joystick controller from the base. The improvement comprises a ring and a spacer for positioning the ring spaced apart from the base. An outer housing encloses the base, the spacer and the ring with the housing having a substantially planar surface. The substantially planar surface has a radius of curvature which is greater than the outer ring of the ring. A cylindrically shaped member is mounted near the center of the planar surface. The member has a radius of curvature less than the inner radius of the ring and is positioned such that the ring passes through the member and rests on the surface. Thus, the rotation of the handle about its pivotal axis causes the cord to be wound or unwound about the spacer in the housing.

4 Claims, 3 Drawing Figures

JOYSTICK CONTROLLER

DESCRIPTION

1. Technical Field

The present invention relates to a joystick controller and, more particularly, to a joystick controller having a cord which can be wound about a spacer within the controller.

2. Background Art

Joystick controllers are used in various applications, one of which is to control the movement of figures or objects in a video game. Such video games are generally used in a home environment, and joystick controllers must, therefore, be highly reliable, resistant to damage through abuse, inexpensive, easy to operate, and, above all, safe. The latter factor is of particular importance in video games because such games are often used by children who can tripped over the cord of the joystick controller if care is not taken.

A typical joystick controller is shown and described U.S. Pat. No. 4,349,708 and U.S. Pat. No. 4,124,787. In these controllers, an electrical cord connects the joystick controller to the video console. The cord carries the signal from the joystick controller to the video console.

SUMMARY OF THE INVENTION

The present invention provides a joystick controller in which the cord that carries the signal from the joystick controller to the video console can be wound about a spacer within the joystick controller such that minimal amount of cord is exposed, thereby increasing safety by preventing accidents due to tripping over the cord and the like. The invention is an improvement to a joystick controller of the type which has a handle pivotally mounted in a base for selective movement about a pivotal axis from a nominal resting position for selectively generating switch closures. A cord from the base carries the electrical signals from the switch closures. The improvement comprises a ring and a spacer for positioning the ring spaced apart from the base. An outer housing encloses the base, the spacer and the ring. The housing has a substantially planar surface with the radius of curvature greater than the outer radius of the ring and a substantially cylindrically shaped member mounted near the center thereof. The member has a radius less than the inner radius of the ring. The ring slips over the member and rests against the substantially planar surface. Thus, the rotation of the handle about the pivotal axis causes the cord to be wound or unwound about the spacer in the housing.

DETAILED DESCRIPTION OF THE DRAWINGS

Figure 1:
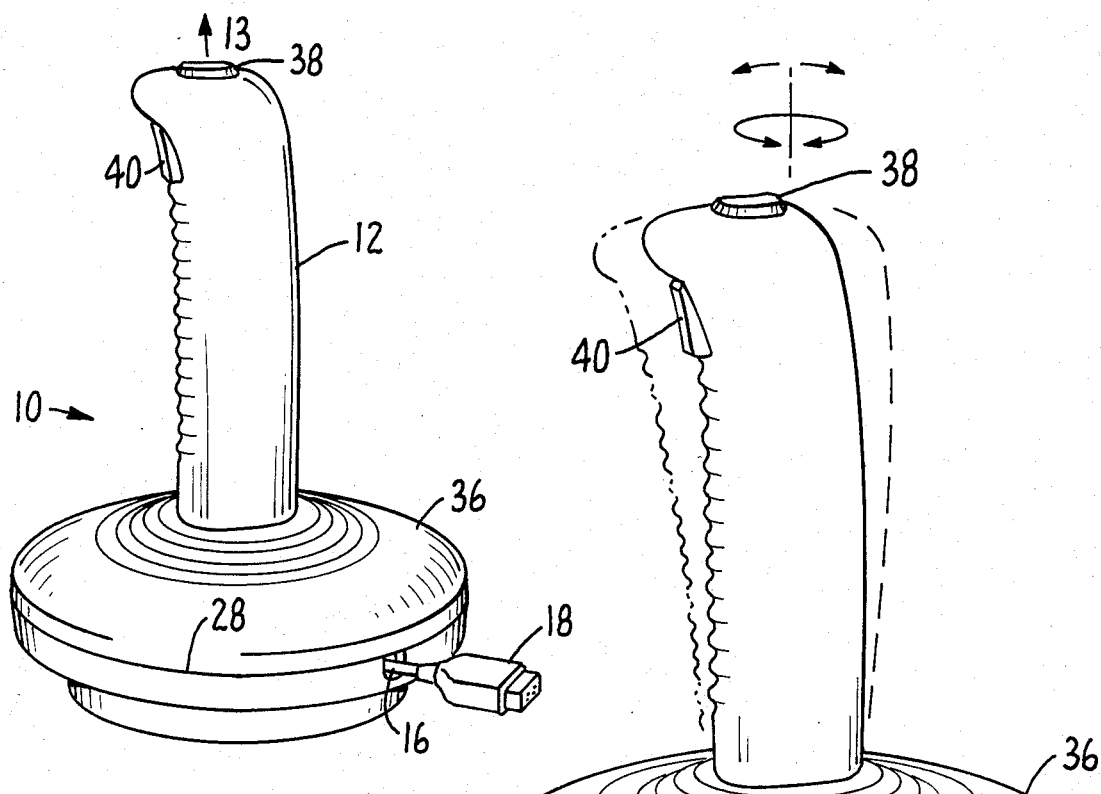
FIG. 1 is a perspective view of the joystick controller of the present invention.
Figure 2:
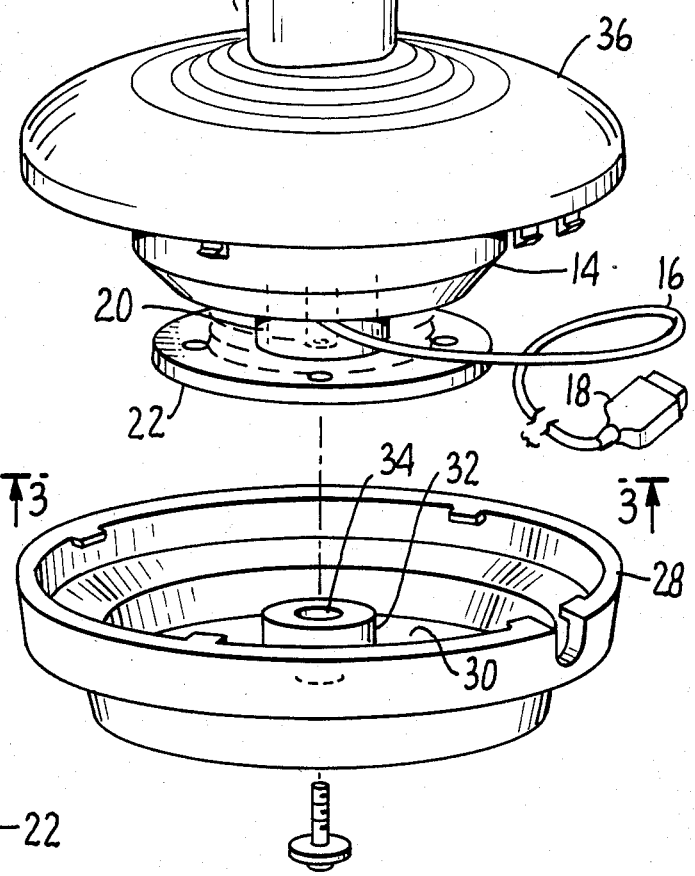
FIG. 2 is an exploded perspective view of certain elements of the joystick controller of FIG. 1.
Figure 3:
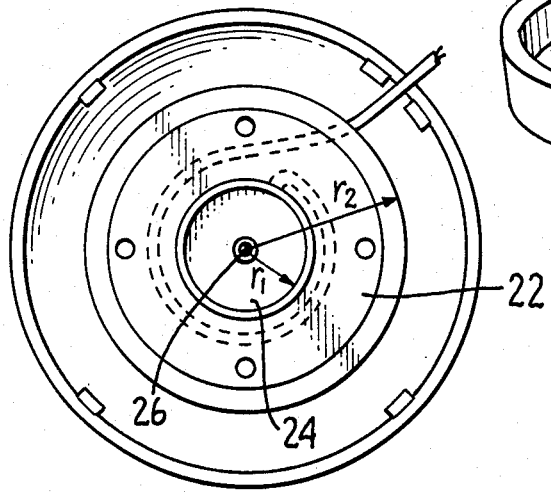
FIG. 3 is a plan view of the joystick controller shown in FIG. 2 taken along the line 3—3.

Referring to FIG. 1, there is shown an improved joystick controller 10 of the present invention. The improved joystick controller 10 is of the type which has a handle 12 pivotally mounted in a base 14. The handle is pivotally mounted for selective movement about a pivotal axis 13 from a nominal rest position for selectively generating switch closures. The switch closures are within the base 14 and are not shown. However, such switches are well-known in the art. An example can be found in U.S. Pat. No. 4,349,708. A cord 16 from the base 14 carries electrical signals from the switch closures within the base 14. The cord 16 terminates in a plug 18 for electrical attachment to a video console (not shown).

The improvement of the present invention comprises a ring 22. A spacer 20 positions the ring 22 spaced apart from the base. The spacer 20 is substantially cylindrically shaped. The ring 22 has an inner radius $r_1$ and an outer radius $r_2$. The spacer 20 is attached to the ring 22 along the circumference of the inner radius $r_1$. A support rod 26 is located centrally along the axis of the cylindrically shaped spacer 20. An outer housing 28 encloses the base 14, the spacer 20 and the ring 22. The outer housing has a substantially planar surface 30. The substantially planar surface 30 has a radius of curvature which is greater than the outer radius $r_2$ of the ring 22. A substantially cylindrically shaped member 32 is mounted in the center of the substantially planar surface 30. The member 32 has an aperture 34 in the center thereof. The radius of curvature of the member 32 is less than the inner radius $r_1$ of the ring 22. The aperture 34 is larger than the diameter of the support rod 26. The member 32 is positioned to pass through the inner radius $r_1$ of the ring 22. The support rod 26 would fit in the aperture 34. The ring 22 would rest on the surface 30. A cover 36 attaches to the outer housing 28, thereby seating the base 14, spacer 20, ring 22, within the housing 28.

The seating of the ring 22 within the housing 28 is such that the handle 12 can be rotated about its pivotal axis 13 causing the cord 16 to be wound or unwound about the spacer 20 in the housing 28. The rotation of the handle 12 winds the cord 16 about the spacer 20 such that the cord is not loose and can be safely stored away, as shown in FIG. 1.

The improvement of the present invention is such that the cord 16 can be released from the joystick controller 10 only as much as is needed. Thus, excessive cord 16, which poses a safety hazzard, will not arise.

In another improvement the joystick controller 10 comprises a switch 38 or 40 located at the end of the handle 12, at the end not mounted in the base 14. The switch 38 or 40 is electrically connected to the cord 16, which is connected to the video console. In contrast with the switches of the prior art, which are typically mounted in the base of the joystick controller, the switch 38 or 40 mounted at the terminal of the handle 12 provides the user with a single-handed operation of both the pivotal movement of the handle 12, as well as the switch activation, which is necessary in certain types of video games. This "one-hand" operation facilitates the use of the joystick controller 10 of the present invention.

It should be clear from the foregoing that an increase in safety, as well as ease of use of the improved joystick controller, of the present invention is disclosed. While a preferred embodiment has been illustrated and detailed, it is clear that those skilled in the art may modify and adapt the embodiment disclosed herein. Such modifications and adaptations are within the sphere and scope of the present invention as set forth in the following claims.

I claim:

1. In a joystick controller of the type having a handle pivotally mounted in a base for selective movement about a pivotal axis from a nominal rest position for selectively generating switch closures; a cord from said base for carrying electrical signals from said switch closures, wherein the improvement comprising:

a ring having an inner radius and an outer radius a spacer for positioning said ring spaced apart from said base; one end of said spacer attached to said ring, the other end of said spacer attached to said base; and a housing for enclosing said base, said spacer, and said ring; said housing having a substantially planar surface with a radius of curvature greater than the outer radius of said ring; a substantially cylindrically shaped member having a radius of curvature less than said inner radius being positioned near the center of said surface; said housing with said member being engaged with said ring disposed over said member and resting against said surface;

whereby the rotation of said handle about said pivotal axis winds and unwinds said cord from said controller.

2. The controller of claim 1, wherein said spacer is substantially cylindrically shaped.

3. The joystick controller of claim 2, wherein said spacer further comprises a support rod centrally located along the axis of said cylindrically shaped spacer and said cylindrically shaped member having an aperture therein for receiving said support rod.

4. The controller of claim 1 further comprising switch means in said handle at an end other than the end mounted in said base; said switch means electrically connected to said cord.

* * * * *